United States Patent
Kim

(10) Patent No.: US 8,620,012 B2
(45) Date of Patent: Dec. 31, 2013

(54) APPARATUS AND METHOD FOR PROVIDING STEREO EFFECT IN PORTABLE TERMINAL

(75) Inventor: Gang-Youl Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1356 days.

(21) Appl. No.: 12/324,191

(22) Filed: Nov. 26, 2008

(65) Prior Publication Data
US 2009/0136047 A1    May 28, 2009

(30) Foreign Application Priority Data
Nov. 27, 2007 (KR) .................. 10-2007-0121317

(51) Int. Cl.
*H04R 5/00* (2006.01)

(52) U.S. Cl.
USPC ........ 381/310; 381/1; 381/2; 381/17; 381/18; 381/303; 381/309; 381/97; 381/61

(58) Field of Classification Search
USPC .......... 381/1, 2, 17, 18, 303, 309, 310, 97, 61
See application file for complete search history.

(56) References Cited

U.S. PATENT DOCUMENTS

| | | | |
|---|---|---|---|
| 7,006,636 B2* | 2/2006 | Baumgarte et al. | 381/17 |
| 7,787,630 B2* | 8/2010 | Lerner et al. | 381/2 |
| 7,889,871 B2* | 2/2011 | Gierl et al. | 381/10 |
| 2005/0135629 A1* | 6/2005 | Kim et al. | 381/17 |

FOREIGN PATENT DOCUMENTS

| | | | |
|---|---|---|---|
| KR | 10-1999-0004322 A | 1/1999 | |
| KR | 10-2005-0064442 A | 6/2005 | |

* cited by examiner

*Primary Examiner* — Matthew Reames
*Assistant Examiner* — Benjamin Tzu-Hung Liu
(74) *Attorney, Agent, or Firm* — Jefferson IP Law, LLP

(57) ABSTRACT

An apparatus and a method for providing a stereo effect when playing an audio file at a portable terminal are provided. The apparatus includes a component extractor for extracting a mono component and stereo components from an audio signal and a gain controller for determining a signal ratio of the stereo components to the mono component and for controlling a stereo gain according to the signal ratio.

19 Claims, 6 Drawing Sheets

APPARATUS AND METHOD FOR PROVIDING STEREO EFFECT IN PORTABLE TERMINAL

PRIORITY

This application claims the benefit under 35 U.S.C. §119(a) to a Korean patent application filed in the Korean Intellectual Property Office on Nov. 27, 2007 and assigned Serial No. 10-2007-0121317, the entire disclosure of which is hereby incorporated by reference.

BACKGROUND OF THE INVENTION

1. Field of the Invention

The present invention relates generally to an audio apparatus of a portable terminal. More particularly, the present invention relates to an apparatus and a method for providing a stereo effect when playing an audio file in the portable terminal.

2. Description of the Related Art

Recently, portable terminals have become necessary accessories in the modern life and are widely used by people of all ages. Because of their widespread use, service providers and terminal manufacturers are competing in product (or service) development for product differentiation.

For example, the portable terminal is evolving into a multimedia device and providing various additional functions such as a phone book, games, a short message service, an e-mail service, a morning call service, a digital camera, and a wireless Internet service.

In response to the multimedia trend, portable terminals that are capable of playing music files have been developed and are currently on the market. The portable terminal capable of playing music files enables the user to listen to the music using the portable terminal alone, without a multimedia player such as a conventional MP3 player. On account of its convenience, the use of such a portable terminal is increasing among users and especially in the youth market.

Further, portable terminals are being produced and are coming into the market having an equalizer function and a stereo audio file play function for providing the music in accordance with a user's inclination. That is, the equalizer and audio file play functions allow a user to regulate a particular frequency of low sound, middle sound, and high sound based on the music genre (e.g. rock, classic, ballad, jazz, dance, etc).

To enhance the stereo effect, the stereo audio file play function uses a Left (L) component and a Right (R) component as two input signals and outputs a L+R sum signal, a L component, and a R component. Alternatively, the stereo audio file play function uses the L and R stereo components as two input signals and outputs the L component and the R component at a proper angle using a Head Related Transfer Function (HRTF).

When using the L and R stereo components as the two input signals and outputting the L+R sum signal, the L component, and the R component, the stereo effect enhancement method does not utilize the HRTF and thus has a less complicated implementation because it requires fewer computations. However, this method does not consider the head and the pinna used by the human to locate the sound resource and thus cannot exhibit a notable performance.

Further, since the delay of the L signal and the R signal is combined with the other signals, the L signal may include the R component and the R signal may include the L component. Accordingly, the stereo effect is likely to deteriorate.

The alternative method uses the L and R stereo components as the two input signals and outputs the L component and the R component at a proper angle using the HRTF. However, this process merely divides the L signal and the R signal. As a result, the stereo effect is lessened in simultaneously processing the mono component of the L signal and the R signal. Accordingly, there is a need for an apparatus and a method that provides an improved stereo effect in a portable terminal.

SUMMARY OF THE INVENTION

An aspect of the present invention is to address at least the above mentioned problems and/or disadvantages and to provide at least the advantages described below. Accordingly, an aspect of the present invention is to provide an apparatus and a method for providing a stereo effect in a portable terminal.

Another aspect of the present invention is to provide an apparatus and a method for extracting components of an input signal to provide a stereo effect in a portable terminal.

Yet another aspect of the present invention is to provide an apparatus and a method for regulating a gain corresponding to a phase difference of components to provide a stereo effect in a portable terminal.

According to an aspect of the present invention, an audio apparatus for providing a stereo effect in a portable terminal is provided. The audio apparatus includes a component extractor for extracting a mono component and stereo components from an audio signal and a gain controller for determining a signal ratio of the stereo components to the mono component and for controlling a stereo gain according to the signal ratio.

According to another aspect of the present invention, a method for providing a stereo effect at a portable terminal is provided. The method includes extracting a mono component and stereo components from an audio signal, determining a signal ratio of the stereo components to the mono component, regulating the stereo effect by adjusting a stereo gain based on the signal ratio and outputting the audio signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for providing a stereo effect in a portable terminal. The term "portable terminal" denotes a mobile communication terminal capable of reproducing music such as a cellular phone, a Personal Communication System (PCS), a Personal Data Assistant (PDA), an International Mobile Telecommunication (IMT)-2000 terminal, and a broadband system, as well as portable devices such as an MP3 player and a Portable Multimedia Player (PMP). Hereinafter, descriptions are provided with a general structure of those examples.

Figure 1:
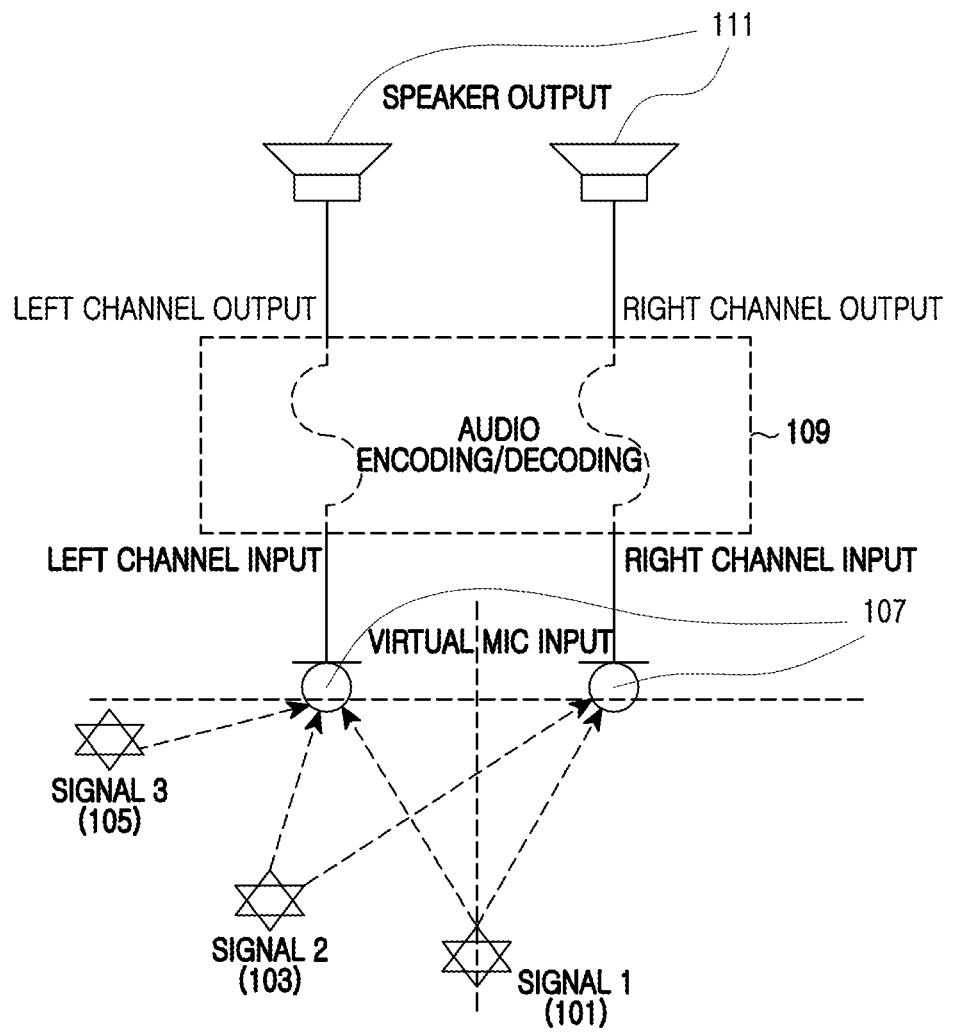
FIG. 1 is a diagram of operations of an audio apparatus applied to a portable terminal according to an exemplary embodiment of the present invention.

FIG. 1 illustrates operations of an audio apparatus applied to a portable terminal according to an exemplary embodiment of the present invention.

Referring to FIG. 1, the audio apparatus includes two microphones 107, an Audio Encoding/Decoding Unit 109, and output speakers 111.

FIG. 1 virtually depicts operations of the audio apparatus for generating a stereo signal, encoding and decoding the stereo signal, and outputting the signal through the speakers 111.

The two microphones 107 of the audio apparatus are assumed to receive both channels (Left signal and Right signal) of a stereo audio file. Accordingly, the Left (L) signal of the stereo audio file includes a mono component and an L component, and the Right (R) signal includes the mono component and an R component. That is, the mono component is common in both the L signal and the R signal, and the L component and the R component are present in the respective signals.

Magnitudes of the components in the respective signals are determined by a phase difference per frequency. Namely, as the stereo component inclines to the left or to the right, the phase difference increases.

When a first signal 101 is positioned in the middle of the two virtual microphones 107 as illustrated in FIG. 1, the phase is the same along a virtual dotted line in the middle. Hence, to extract the mono component from the first signal 101, a maximum adjustable gain is modified to 1.

A second signal 103 is inclined to the left from the first signal 101 and causes a phase difference. To extract the mono component, the gain needs to be adjusted to some degree. In so doing, the gain control range is 1>G>0.

A third signal 105 is input only to the left virtual microphone 107 and not input to the right virtual microphone 107. Thus the phase difference is ∞. To extract the mono component, the gain adjustment is omitted.

FIG. 1 conceptually depicts the gain adjustment for providing the stereo effect at the portable terminal. An exemplary method for providing a stereo effect at the portable terminal will be explained in more detail below with reference to FIG. 4.

Figure 2:
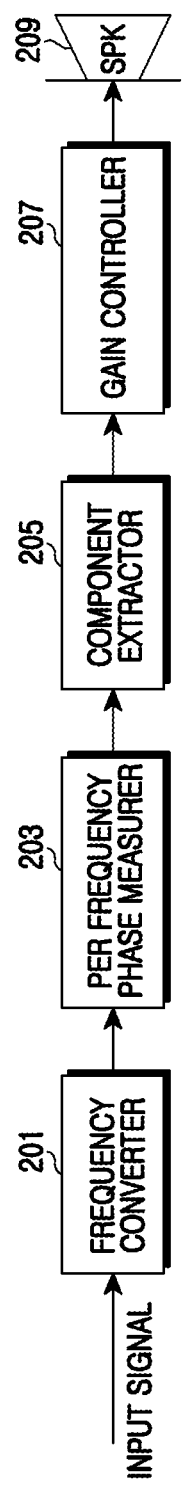
FIG. 2 is a block diagram of an audio apparatus applied to a portable terminal according to an exemplary embodiment of the present invention.

FIG. 2 is a block diagram of an audio apparatus applied to a portable terminal according to an exemplary embodiment of the present invention.

Referring to FIG. 2, the audio apparatus may include a frequency converter 201, a per frequency phase measurer 203, a component extractor 205, a gain controller 207 and a speaker 209.

When an audio file decoding event occurs, the frequency converter 201 of the audio apparatus converts the frequency by applying a Fast Fourier Transform (FFT) on the input signal and provides the converted signal to the per frequency phase measurer 203.

The per frequency phase measurer 203 determines phase information and a phase magnitude of the signal passing through the frequency conversion. The phase information and phase magnitude are determined in order to compute the gain based on the phase difference of the mono component and the stereo component. The per frequency phase measurer 203 also determines a value for distinguishing the mono component and the stereo components using the determined per frequency phase information and phase magnitude.

The component extractor 205 extracts the components of the input signal using the per frequency gain and the phase information. That is, the component extractor 205 extracts the stereo components (the R component and the L component) and the mono component from the input signal.

The gain controller 207 controls the gain of the stereo components under optimal conditions by determining a signal ratio of the stereo components to the extracted mono component. The gain controller 207 can control the gain according to a selection mode of the portable terminal or at the defined component ratio of the stereo components. For example, the gain controller 207 can control the gain to 3 dB~9 dB according to the inclination of the user of the portable terminal, or at the optimal stereo ratio (6 dB) acquired through experiments.

Although a controller of the portable terminal can provide the functions of the audio apparatus, the audio apparatus is illustrated above as a separately provided component to ease in the explanation and understanding, but not to limit the scope of the invention. One who skilled in the art can appreciate that various modifications of the present invention can be made. For instance, the controller can process all the described functions.

Figure 3:
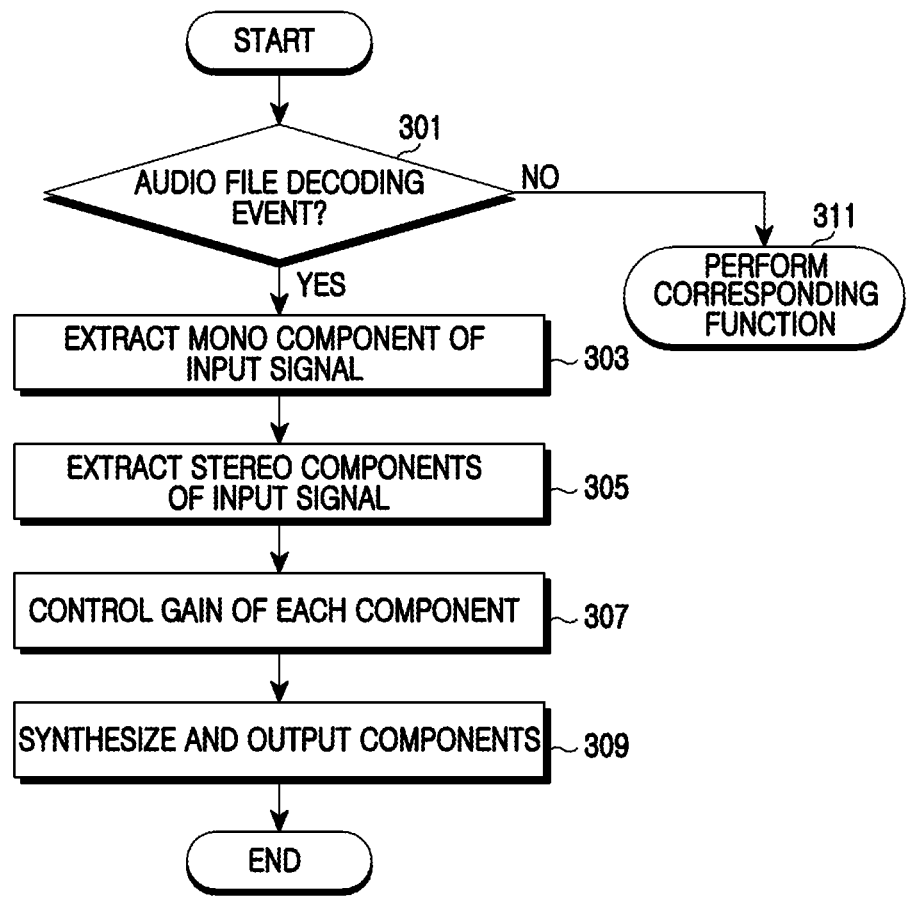
FIG. 3 is a flowchart of a method for providing a stereo effect in a portable terminal according to an exemplary embodiment of the present invention.

FIG. 3 is a flowchart of a method for providing a stereo effect in a portable terminal according to an exemplary embodiment of the present invention.

Referring to FIG. 3, in step 301, the portable terminal determines whether the audio file decoding event occurs or not. When the audio file decoding event does not occur, the portable terminal performs a corresponding function (e.g., a standby mode) in step 311.

When the audio file decoding event does occur, the portable terminal extracts the mono component of the input signal in step 303 and extracts the stereo components from the input signal in step 305.

After controlling the gains of the mono component and the stereo components in step 307, the portable terminal processes to synthesize and output the mono component and the stereo components in step 309. Herein, the gain of the mono component and the stereo components is a value to distinguish the mono component and the stereo components, and can be used as the gain value for the phase difference of the components.

Next, the portable terminal finishes this process.

Figure 4:
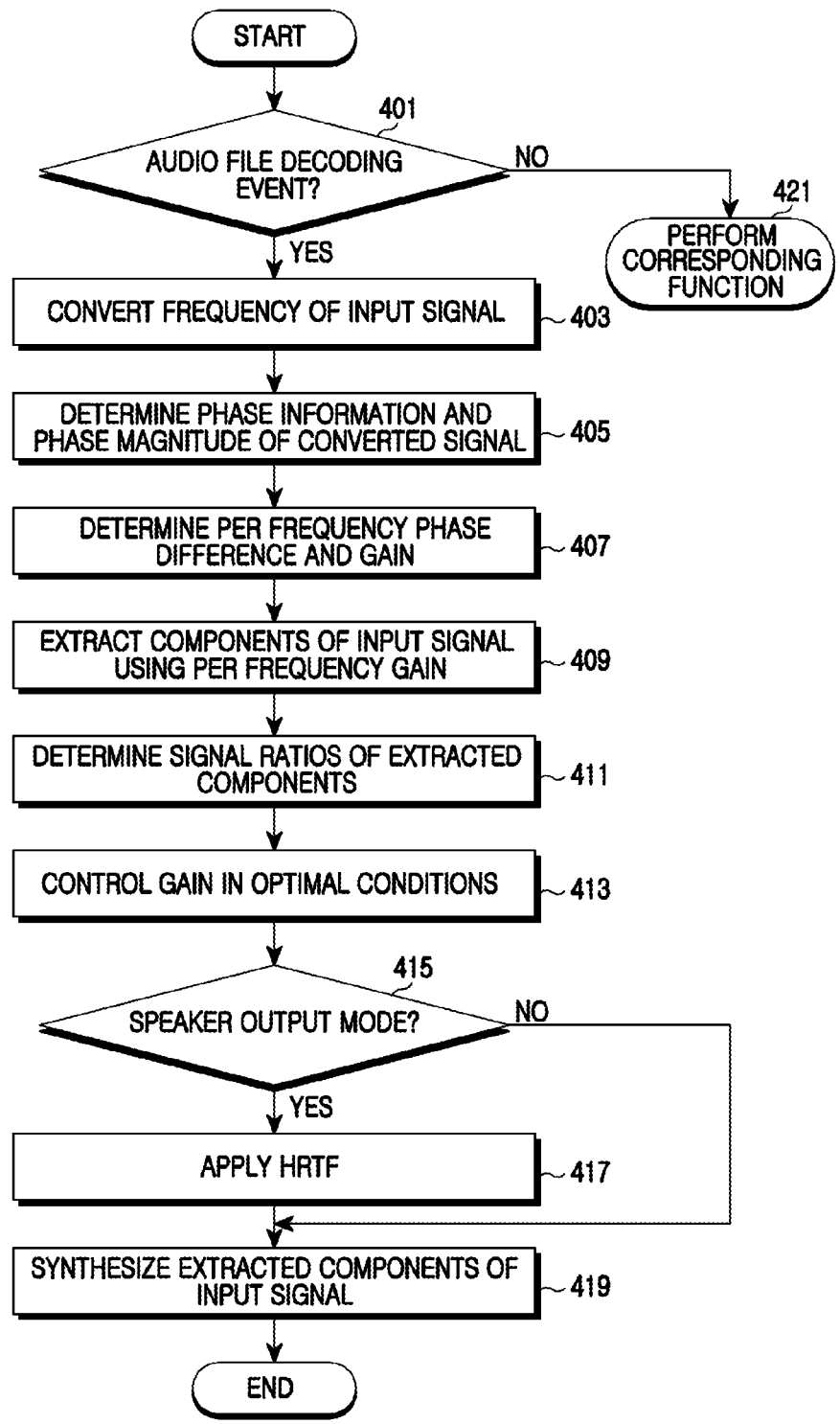
FIG. 4 is a flowchart of a method for providing a stereo effect in a portable terminal according to an exemplary embodiment of the present invention.

FIG. 4 is a flowchart of a method for providing a stereo effect in a portable terminal according to an exemplary embodiment of the present invention.

Referring to FIG. 4, in step 401, the portable terminal determines whether the audio file decoding event occurs or not. When the audio file decoding event does not occur, the portable terminal performs a corresponding function (e.g., a standby mode) in step 421.

When the audio file decoding event does occur, the portable terminal converts the frequency of the input signal in step 403 and determines the phase information and the phase magnitude of the converted signal in step 405. Herein, the portable terminal performs these operations to determine the gain based on the phase difference of the signals. That is, the portable terminal determines the gain based on the phase difference of the mono component and the stereo components.

The portable terminal can convert the frequency of the input signal through the FFT based on Equation (1).

$$X_i(k; m) = \sum_{j}^{m} w(j) x_i(mM/2 + j) \exp\left(-\frac{2\pi}{M} kj\right) \quad (1)$$

In Equation (1), $x_i(n)$ denotes a sample value of the input signal in the time domain of the i-th microphone, $X_i(k;m)$ denotes the converted value in the frequency domain, M denotes a frame size, k denotes the k-th FFT point value, and m denotes the m-th frame.

After the frequency conversion of the input signal as above, the portable terminal can determine the phase information of the converted signal based on Equation (2) and determine the phase magnitude of the converted signal using the phase information based on Equation (3).

$$\angle X(k; m) = \tan^{-1}\left(\frac{\text{Im}(X(k; m))}{\text{Re}(X(k; m))}\right) \quad (2)$$

In Equation (2), X(k;m) denotes the value after the frequency conversion, k denotes the k-th FFT point value, and m denotes the m-th frame.

$$|X(k;m)| = \sqrt{\text{Re}(X(k;m))^2 + \text{Im}(X(k;m))^2} \quad (3)$$

In Equation (3), X(k;m) denotes the value after the frequency conversion, k denotes the k-th FFT point value, and m denotes the m-th frame.

Next, the portable terminal determines the per frequency phase difference and the gain using the phase difference in step 407. Herein, the phase difference indicates the value for distinguishing the mono component and the stereo component.

The portable terminal determines the per frequency phase difference based on Equation (4).

$$\theta(k;m) = \angle X_1(k;m) - \angle X_2(k;m) \quad (4)$$

In Equation (4), X(k;m) denotes the value after the frequency conversion, k denotes the k-th FFT point value, and m denotes the m-th frame.

After computing the per frequency phase difference using Equation (4), the portable terminal determines the gains for distinguishing the mono component and the stereo components. Equation (5) expresses the gain value of the mono component and Equation (6) expresses the gain value of the stereo components.

$$G_{mono}(k; m) = \frac{1}{1 + (\alpha \times |\theta(k; m)|)} \quad (5)$$

In Equation (5), $\alpha$ denotes a constant for regulating an application variation based on the phase difference and $\theta(k;m)$ denotes the per frequency phase difference.

$$G_{stereo}(k; m) = \frac{(\alpha \times |\theta(k; m)|)}{1 + (\alpha \times |\theta(k; m)|)} \quad (6)$$

In Equation (6), $\alpha$ denotes the constant for regulating the application variation based on the phase difference and $\theta(k;m)$ denotes the per frequency phase difference.

In step 409, the portable terminal extracts the components of the input signal using the per frequency gain and the phase information. More particularly, the stereo components (the R component and the L component) and the mono component are extracted from the input signal in step 409. The portable terminal can extract the components of the input signal using the following equations. Equation (7) and Equation (8) express the extraction of the stereo components, and Equation (9) expresses the extraction of the mono component.

$$X_R(k;m) = G_{stereo}(k;m) \times |X_R(k;m)| \times \angle X_R(k;m) \quad (7)$$

In Equation (7), $G_{stereo}(k;m)$ denotes the gain value of the stereo components, $|X_R(k;m)|$ denotes the phase magnitude of the R component, and $\angle X_R(k;m)$ denotes the phase information of the R component.

$$X_L(k;m) = G_{stereo}(k;m) \times |X_L(k;m)| \times \angle X_L(k;m) \quad (8)$$

In Equation (8), $G_{stereo}(k;m)$ denotes the gain value of the stereo components, $|X_L(k;m)|$ denotes the phase magnitude of the L component, and $\angle X_L(k;m)$ denotes the phase information of the L component.

$$X_{mono}(k;m) = G_{mono}(k;m) \times |X_{L/R}(k;m)| \times \angle X_{L/R}(k;m) \quad (9)$$

In Equation (9), $G_{mono}(k;m)$ denotes the gain value of the mono component, $|X_{L/R}(k;m)|$ denotes the phase magnitude of the L/R component, and $\angle X_{L/R}(k;m)$ denotes the phase information of the L/R component.

In step 411, the portable terminal determines the signal ratio of the stereo components to the mono component extracted in step 409, and controls the gain of the stereo component under the optimal condition in step 413.

The portable terminal can determine the signal ratio of the stereo component to the mono component based on Equations (10) and (11).

$$RMR(k) = -10\log_{10}\frac{\sum_{M} X_R^2(k; m)}{\sum_{M} X_{mono}^2(k; m)} \quad (10)$$

Equation (10) expresses the signal ratio of the R component to the mono component. In Equation (10), $X_R(k;m)$ denotes the R component extracted from the input signal and $X_{mono}(k;m)$ denotes the mono component extracted from the input signal.

$$LMR(k) = -10\log_{10} \frac{\sum_M X_L^2(k;m)}{\sum_M X_{mono}^2(k;m)} \quad (11)$$

Equation (11) expresses the signal ratio of the L component to the mono component. In Equation (11), $X_L(k;m)$ denotes the L component extracted from the input signal and $X_{mono}(k;m)$ denotes the mono component extracted from the input signal.

The portable terminal can control the gain according to the selection mode of the user of the portable terminal, or at the predefined component ratio of the stereo components. For instance, the portable terminal can control the gain to 3 dB~9 dB according to the preference of the user of the portable terminal or to the optimal stereo component ratio (6 dB) acquired through experiment.

In step 415, the portable terminal determines an output mode of the portable terminal. When the output mode of the portable terminal is an earphone output mode, the portable terminal processes to synthesize the stereo components and the mono component with the gains controlled so as to regulate the stereo effect with the controlled stereo gain in step 419. In other words, the portable terminal processes to synthesize and output the L component and the R component of the controlled gains with the mono component (L component+mono component, R component+mono component).

When the output mode of the portable terminal is a speaker output mode, the portable terminal applies the Head Related Transfer Function (HRTF) in step 417. The HRTF is the filter coefficient modeling the path from the sound source to the eardrum and varies depending on the relative locations of the sound source and the head. In step 419, the portable terminal controls to synthesize the stereo components and the mono component with the gains controlled, so as to regulate the stereo effect through the stereo gain control. That is, the portable terminal processes to synthesize and output the L component and the R component of the controlled gain with the mono component (L component+mono component, R component+mono component).

Next, the portable terminal finishes this process.

FIGS. 5A to 5D depict components extracted from an input signal according to an exemplary embodiment of the present invention. FIGS. 6A to 6E depict audio-signal-processed components extracted at an audio apparatus.

Figure 5A:
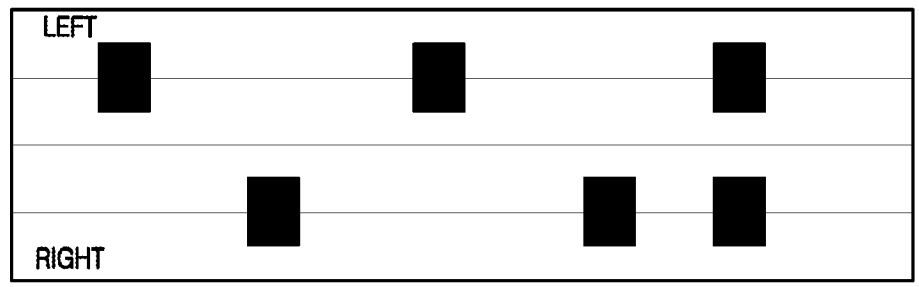
FIGS. 5A to 5D are diagrams of components extracted from an input signal according to an exemplary embodiment of the present invention.

FIG. 5A illustrates the stereo signal of the audio apparatus according to an exemplary embodiment of the present invention.

The stereo signal of FIG. 5A includes the L signal and the R signal. The L signal and the R signal include the L component and the R component, and the mono component common to the L signal and the R signal.

Figure 5B:
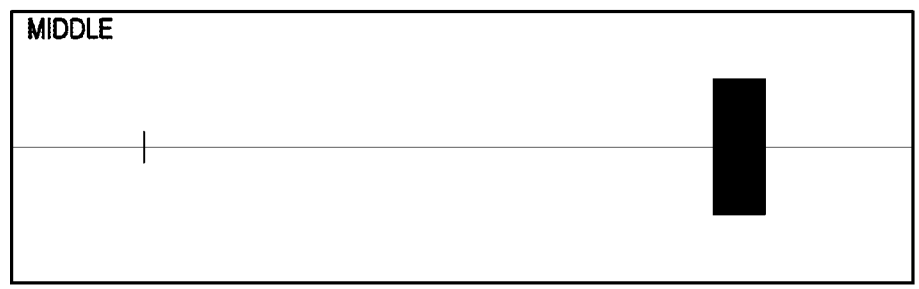
Figure 5C:
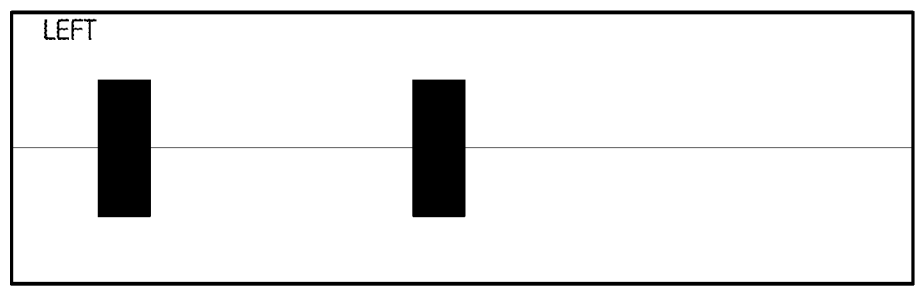
Figure 5D:
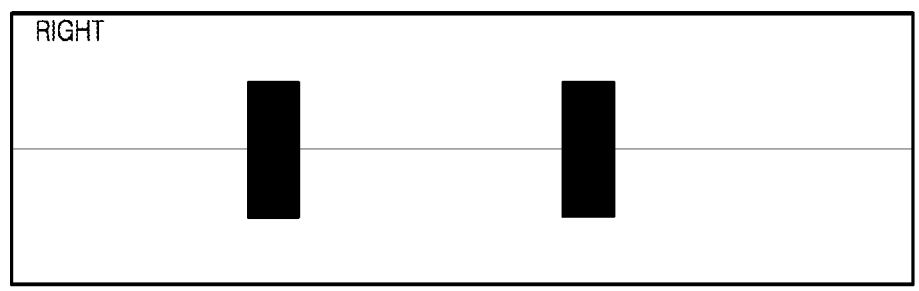

FIG. 5B illustrates the mono component extracted at an exemplary audio apparatus of the present invention. FIGS. 5C and 5D illustrate the L component and the R component extracted from the L signal and the R signal. By processing the components using the audio signal, results illustrated in FIGS. 6A to 6E are obtained.

Figure 6A:
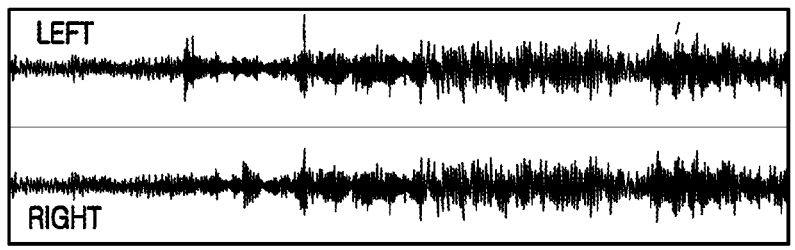
FIGS. 6A to 6E are diagrams of audio-signal-processed components extracted at the audio apparatus.
Figure 6B:
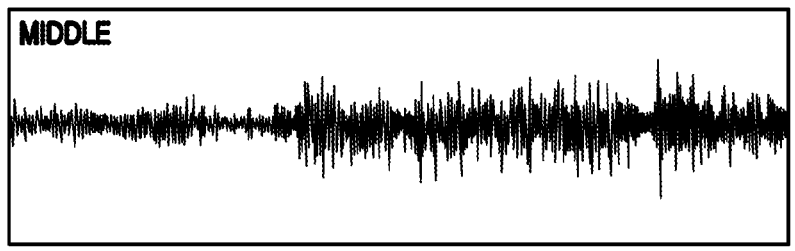
Figure 6C:
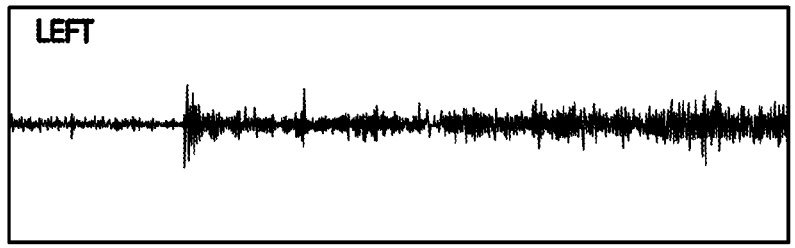
Figure 6D:
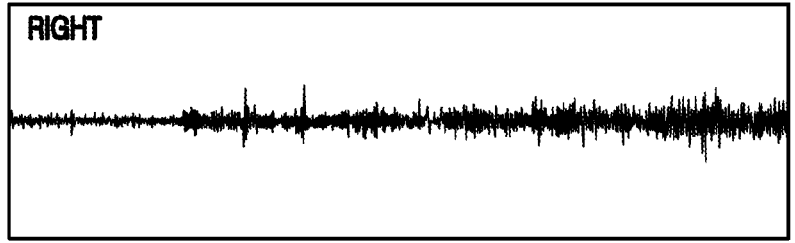

In the original stereo signal of FIG. 6A, the mono signal of FIG. 6B, the L signal of FIG. 6C, and the R signal of FIG. 6D, the L signal and the R signal are separated.

Figure 6E:
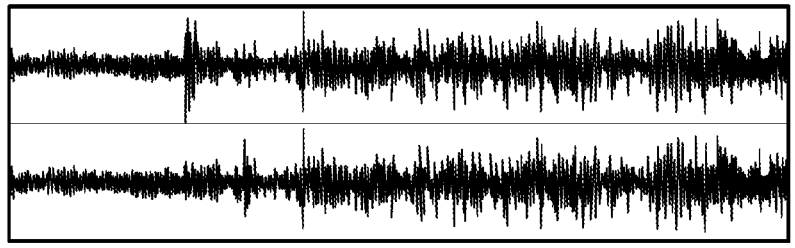

FIG. 6E depicts the synthesized components after the gain of the stereo components is controlled in the separated signals.

As set forth above, an exemplary audio apparatus of the portable terminal extracts the components from the input signal and provides the stereo effect by controlling the gain based on the phase difference of the components. Therefore, the deterioration of the stereo effect in the conventional portable terminal can be addressed. Further, the stereo effect can be regulated according to the user's taste and the computation processing can be reduced by virtue of the simple frequency conversion, compared to the conventional method which provides the stereo effect using a filter.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An audio apparatus for providing a stereo effect in a portable terminal, the audio apparatus comprising:
  a component extractor for extracting a mono component and stereo components from an audio signal; and
  a gain controller for determining a signal ratio of the stereo components to the mono component and for controlling a stereo gain according to the signal ratio,
  wherein the audio signal includes a Left (L) signal and a Right (R) signal,
  wherein the L signal includes an L component and the mono component, and the R signal includes an R component and the mono component, and
  wherein the stereo components comprise an L component of the L signal and an R component of the R signal.

2. The audio apparatus of claim 1, wherein the gain controller regulates the stereo effect through the stereo gain control in an earphone output mode and applies a Head Related Transfer Function (HRTF) to regulate the stereo effect through the stereo gain control in a speaker output mode.

3. The audio apparatus of claim 2, wherein the gain controller determines the gain of the mono component according to the phase difference based on the following equation:

$$G_{mono}(k;m) = \frac{1}{1 + (\alpha \times |\theta(k;m)|)}$$

where $\alpha$ denotes a constant for regulating an application variation based on the phase difference and $\theta(k;m)$ denotes the phase difference, and the gain controller determines the gain of the stereo component according to the phase difference based on the following equation:

$$G_{stereo}(k;m) = \frac{(\alpha \times |\theta(k;m)|)}{1 + (\alpha \times |\theta(k;m)|)}$$

where $\alpha$ denotes the constant for regulating the application variation based on the phase difference and $\theta(k;m)$ denotes the phase difference.

4. The audio apparatus of claim 3, wherein the gain controller computes an R component signal ratio of the stereo component to the mono component based on the following equation:

$$RMR(k) = -\log_{10} \frac{\sum_M X_R^2(k;m)}{\sum_M X_{mono}^2(k;m)}$$

where $X_R(k;m)$ denotes the R component extracted from the input signal and $X_{mono}(k;m)$ denotes the mono component extracted from the input signal, and the gain controller computes an L component signal ratio of the stereo component to the mono component based on the following equation:

$$LMR(k) = -10\log_{10} \frac{\sum_M X_L^2(k;m)}{\sum_M X_{mono}^2(k;m)}$$

where $X_L(k;m)$ denotes the L component extracted from the input signal and $X_{mono}(k;m)$ denotes the mono component extracted from the input signal.

5. The audio apparatus of claim 1, wherein the component extractor determines a phase difference using phase information and phase magnitude of the components of the audio signal according to a frequency conversion and a gain based on the phase difference, and extracts the mono component and the stereo components of the audio signal using the gain and the phase information.

6. The audio apparatus of claim 5, wherein the input audio signal passes through the frequency conversion based on the following equation:

$$X_i(k;m) = \sum_j^m w(j)x_i(mM/2 + j)\exp\left(-\frac{2\pi}{M}kj\right)$$

where $x_i(n)$ denotes a sample value of an input signal in a time domain of an i-th microphone, $X_i(k;m)$ denotes a converted value in a frequency domain, M denotes a frame seize, k denotes a k-th Fast Fourier Transform (FFT) point value, and m denotes an m-th frame.

7. The audio apparatus of claim 6, wherein the phase information of the components of the audio signal is determined based on the following equation:

$$\angle X(k;m) = \tan^{-1}\left(\frac{Im(X(k;m))}{Re(X(k;m))}\right)$$

where $X(k;m)$ denotes a value after the frequency conversion, k denotes the k-th FFT point value, and m denotes the m-th frame, and the phase magnitude is determined based on the following equation:

$$|X(k;m)| = \sqrt{Re(X(k;m))^2 + Im(X(k;m))^2}$$

where $X(k;m)$ denotes the value after the frequency conversion, k denotes the k-th FFT point value, and m denotes the m-th frame.

8. The audio apparatus of claim 7, wherein the phase difference is determined based on the following equation:

$$\theta(k;m) = \angle X_1(k;m) - \angle X_2(k;m)$$

where $X(k;m)$ denotes the value after the frequency conversion, k denotes the k-th FFT point value, and m denotes the m-th frame.

9. The audio apparatus of claim 1, wherein the component extractor extracts the mono component based on the following equation:

$$X_{mono}(k;m) = G_{mono}(k;m) \times |X_{L/R}(k;m)| \times \angle X_{L/R}(k;m)|$$

where $G_{mono}(k;m)$ denotes the gain value of the mono component, $|X_{L/R}(k;m)|$ denotes a phase magnitude of an L/R component, and $\angle X_{L/R}(k;m)$ denotes phase information of the L/R component.

10. The audio apparatus of claim 9, wherein the component extractor extracts the stereo components by extracting an R component based on the following equation:

$$X_R(k;m) = G_{stereo}(k;m) \times |X_R(k;m)| \times \angle X_R(k;m)$$

where $G_{stereo}(k;m)$ denotes a gain value of the stereo components, $|X_R(k;m)|$ denotes a phase magnitude of the R component, and $\angle X_R(k;m)$ denotes phase information of the R component, and by extracting an L component based on the following equation:

$$X_L(k;m) = G_{stereo}(k;m) \times |X_L(k;m)| \times \angle X_L(k;m)$$

where $X_L(k;m)$ denotes the L component of the stereo components, $G_{stereo}(k;m)$ denotes the gain value of the stereo components, $|X_L(k;m)|$ denotes the phase magnitude of the L component, and $\angle X_L(k;m)$ denotes the phase information of the L component.

11. A method for providing a stereo effect in a portable terminal, the method comprising:
   extracting a mono component and stereo components from an audio signal;
   determining a signal ratio of the stereo components to the mono component;
   regulating the stereo effect by adjusting a stereo gain based on the signal ratio; and
   outputting the audio signal,
   wherein the audio signal includes a Left (L) signal and a Right (R) signal,
   wherein the L signal includes an L component and the mono component, and the R signal includes an R component and the mono component, and
   wherein the stereo components comprise an L component of the L signal and an R component of the R signal.

12. The method of claim 11, wherein the outputting of the audio signal comprises:
   regulating the stereo effect through the stereo gain control in an earphone output mode;
   applying a Head Related Transfer Function (HRTF); and
   regulating the stereo effect through the stereo gain control in a speaker output mode.

13. The method of claim 11, wherein the extracting of the mono component and the stereo components of the audio signal comprises:
   determining phase information and a phase magnitude of the components of the audio signal by converting a frequency of the input audio signal;
   determining a phase difference using the phase information and the phase magnitude of the signal components;
   determining a gain based on the phase difference; and
   extracting the mono component and the stereo components using the gain and the phase information.

14. The method of claim 13, wherein the converting of the frequency of the input audio signal comprises converting the frequency based on the following equation:

$$X_i(k;m) = \sum_{j}^{m} w(j)x_i(mM/2+j)\exp\left(-\frac{2\pi}{M}kj\right)$$

where $x_i(n)$ denotes a sample value of an input signal in a time domain of an i-th microphone, $X_i(k;m)$ denotes a converted value in a frequency domain, M denotes a frame seize, k denotes a k-th Fast Fourier Transform (FFT) point value, and m denotes an m-th frame.

15. The method of claim 13, wherein the determining of the phase information of the components of the audio signal comprises using the following equation:

$$\angle X(k;m) = \tan^{-1}\left(\frac{Im(X(k;m))}{Re(X(k;m))}\right)$$

where X(k;m) denotes a value after the frequency conversion, k denotes the k-th FFT point value, and m denotes the m-th frame, and
the determining of the phase magnitude comprises using the following equation:

$$|X(k;m)| = \sqrt{Re(X(k;m))^2 + Im(X(k;m))^2}$$

where X(k;m) denotes the value of the frequency conversion, k denotes the k-th FFT point value, and m denotes the m-th frame.

16. The method of claim 13, wherein the determining of the phase difference comprises using the following equation:

$$\theta(k;m) = \angle X_1(k;m) - \angle X_2(k;m)$$

where X(k;m) denotes the value after the frequency conversion, k denotes the k-th FFT point value, and m denotes the m-th frame.

17. The method of claim 13, wherein the determining of the gain of the mono component according to the phase difference comprises using the following equation:

$$G_{mono}(k;m) = \frac{1}{1+(\alpha \times |\theta(k;m)|)}$$

where α denotes a constant for regulating an application variation based on the phase difference and θ(k;m) denotes the phase difference, and
the determining of the gain of the stereo component according to the phase difference comprises using the following equation:

$$G_{stereo}(k;m) = \frac{(\alpha \times |\theta(k;m)|)}{1+(\alpha \times |\theta(k;m)|)}$$

where α denotes the constant for regulating an application variation based on the phase difference and θ(k;m) denotes the phase difference.

18. The method of claim 13, wherein the extracting of the mono component comprises using the following equation:

$$X_{mono}(k;m) = G_{mono}(k;m) \times |X_{L/R}(k;m)| \times \angle X_{L/R}(k;m)$$

where $G_{mono}(k;m)$ denotes the gain value of the mono component, $X_{L/R}(k;m)|$ denotes a phase magnitude of an L/R component, and $\angle X_{L/R}(k;m)$ denotes phase information of the L/R component.

19. The method of claim 13, wherein the extracting of the stereo components comprises:
extracting an R component based on the following equation:

$$X_R(k;m) = G_{stereo}(k;m) \times |X_R(k;m)| \times \angle X_R(k;m)$$

where $G_{stereo}(k;m)$ denotes a gain value of the stereo components, $|X_R(k;m)|$ denotes a phase magnitude of the R component, and $\angle X_R(k;m)$ denotes phase information of the R component, and
extracting an L component based on the following equation:

$$X_L(k;m) = G_{stereo}(k;m) \times |X_L(k;m)| \times \angle X_L(k;m)$$

where $X_L(k;m)$ denotes the L component of the stereo components, $G_{stereo}(k;m)$ denotes the gain value of the stereo components, $|X_L(k;m)|$ denotes the phase magnitude of the L component, and $\angle X_L(k;m)$ denotes the phase information of the L component.

* * * * *